United States Patent
Graham et al.

[19]

[11] Patent Number: 6,003,277

[45] Date of Patent: Dec. 21, 1999

[54] CO-EXTRUDED INTEGRALLY REINFORCED CELLULAR PVC WINDOW SASH

[75] Inventors: Jonathan M. Graham, Clearbrook, Va.; Kim K. De Vormer, Middleville, Mich.

[73] Assignee: Newell Industrial Corporation, Roanoke, Va.

[21] Appl. No.: 09/059,880

[22] Filed: Apr. 14, 1998

Related U.S. Application Data

[60] Provisional application No. 60/043,088, Apr. 15, 1997.

[51] Int. Cl.[6] ........................................ E04C 1/00
[52] U.S. Cl. ................ 52/309.7; 52/309.15; 52/309.16; 52/204.5; 52/204.53; 52/730.3; 52/730.4; 52/730.5; 52/734.1; 52/734.2; 49/504
[58] Field of Search ............................. 52/204.5, 204.53, 52/656.5, 730.5, 730.3, 730.4, 734.1, 734.2, 309.7, 309.15, 309.16; 49/504

[56] References Cited

U.S. PATENT DOCUMENTS

| | | |
|---|---|---|
| 2,349,907 | 5/1944 | Kos et al. .................................. 189/46 |
| 3,764,642 | 10/1973 | Boutillier ................................... 264/47 |
| 3,879,505 | 4/1975 | Boutillier et al. ......................... 264/48 |
| 4,383,812 | 5/1983 | Calcagni ............................... 425/133.1 |
| 4,732,718 | 3/1988 | Jentet ..................................... 264/45.5 |
| 5,129,628 | 7/1992 | Vesper ....................................... 256/31 |
| 5,279,089 | 1/1994 | Gulur .................................... 52/309.11 |
| 5,508,103 | 4/1996 | Cope .................................... 428/318.8 |

*Primary Examiner*—Christopher T. Kent
*Assistant Examiner*—Nkeisha J. Maddox
*Attorney, Agent, or Firm*—Price, Heneveld, Cooper, DeWitt & Litton

[57] ABSTRACT

An integrally reinforced lineal building component including an elongated member having a substantially constant cross-sectional area along substantially the entire length of the building component and comprised of cellular material forming the body and major cross-sectional portion of the building component, and an elongated reinforcement element having a substantially constant cross-sectional area along substantially the entire length of the building component and disposed inside the elongated member and bonded integrally thereto. The reinforcement element is provided at least two flange-like portions integrally attached and disposed at an angle with respect to one another extending lengthwise of and generally parallel to the elongated member.

32 Claims, 2 Drawing Sheets

CO-EXTRUDED INTEGRALLY REINFORCED CELLULAR PVC WINDOW SASH

CROSS-REFERENCE TO RELATED APPLICATION

This application claims priority under 35 U.S.C. § 119(e) on U.S. Provisional Application No. 60/043,088 entitled CO-EXTRUDED INTEGRALLY REINFORCED CELLULAR WINDOW SASH filed Apr. 15, 1997, by Jonathan M. Graham et al., the entire disclosure of which is incorporated herein by reference.

BACKGROUND OF THE INVENTION

Raw material prices for wood have been steadily climbing in recent years with little expectation of a significant drop in the commodity price. Concurrently, a requirement for non-rot millwork-type building components has developed within the window and door industry (as well as within the overall construction industry). In response to these conditions, various manufacturers of window lineal components who previously extruded sash or other profiles of solid PVC have recently developed cellular PVC sash profiles using either the "Free Foam" or "Celuka" foam extrusion process (discrete/single self-skinning PVC foam extrusion).

Structural integrity (as defined by ASTM E330, Procedure A) of such cellular (foam) PVC sash members has so far been less than adequate, and such products have not proven to be able to consistently meet minimum DP grades required by the industry. One possible solution for this could be a co-extruded cellular sash member whose exterior surface has a co-extruded rigid PVC wall and the remaining (interior) profile body is foamed PVC (see FIG. 1); however, the reduced cost benefits inherent to extruded cellular PVC components are largely or even completely lost with this design. Thus, while this design does provide increased structural integrity, there may not be a great deal of other market advantage in producing such a cellular sash with a rigid exterior wall.

BRIEF SUMMARY OF THE INVENTION

The present invention provides a new approach to solving the structural rigidity problem noted above, and in fact may provide a basic, new structural configuration which is not only useful and advantageous in window components and the like but also in various other types of building components or other such products and structures. In this concept, a reduced production cost is achieved by minimizing the thickness and cross-sectional perimeter of the rigid PVC walls and locating them inside the profile, while at the same time maximizing the I-Value (Moment of Inertia) of the sash.

This increased resistance to deflection (structural integrity) is accomplished through design rather than by extruding additional material (i.e., PVC) in the part. More particularly, the present invention is based on the concept of utilizing an integral internal reinforcement element or structure disposed inside a foamed profile structure, the composite structure preferably being formed by co-extrusion.

In the most preferred embodiment, the internal reinforcement element is of generally I-shaped cross section, the particular cross-sectional shape and wall thickness of which may have any of numerous possible variations depending upon the particular circumstances in which it is to be used. Such generally I-shaped internal reinforcement element may have generally planar walls (flanges and webs) of various sizes and aspect ratios, or may comprise any of various hollow or generally tubular configurations whose overall shape is generally in the form of an I, and in these configurations the interior portion of such generally hollow or tubular structures may either remain hollow or contain a desired reinforcement member or structure of many different types and configurations.

Further, in the most preferred embodiments, the overall foamed profile may and desirably does have an outer skin, produced by using the aforementioned self-skinning technology.

DETAILED DESCRIPTION OF PREFERRED EMBODIMENT

Figure 1:
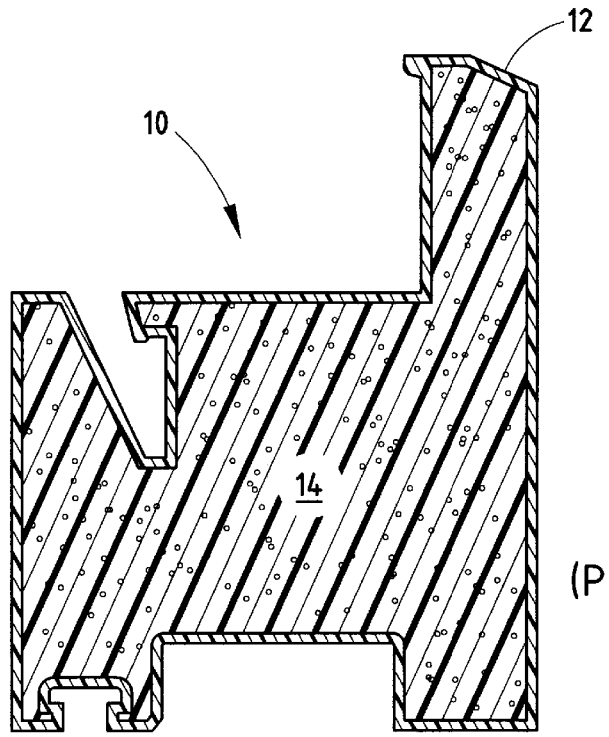
FIG. 1 is a cross-sectional end elevation illustrating a known co-extruded sash profile or the like as referred to in the Background Of The Invention set forth above.
Figure 2:
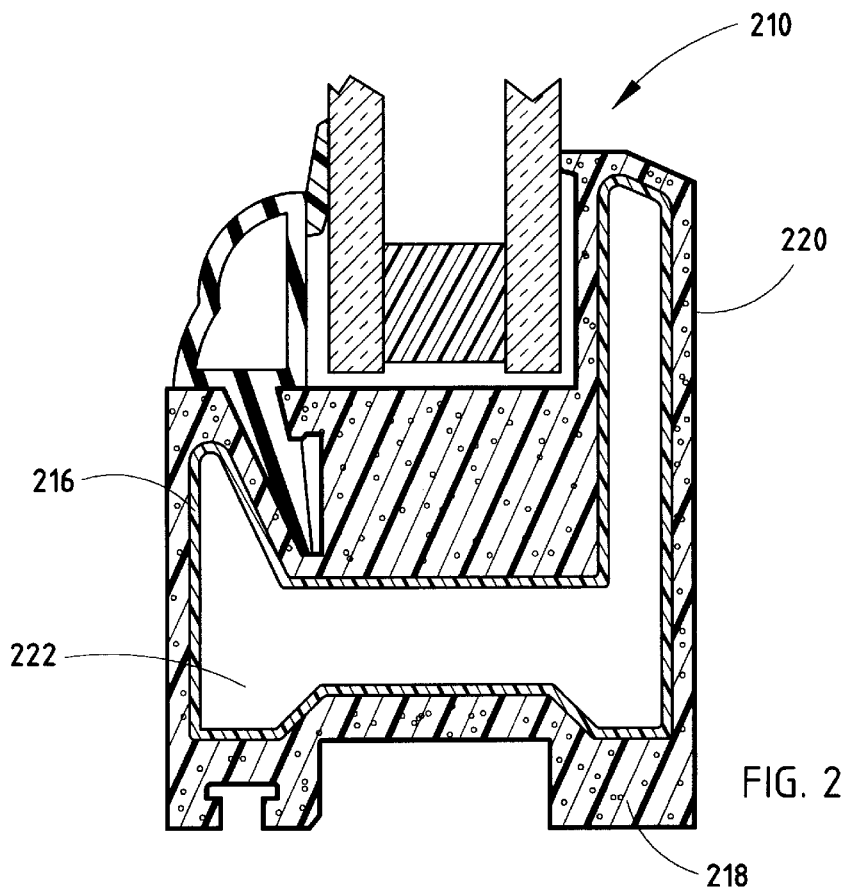
FIG. 2 is a cross-sectional end elevation illustrating a first embodiment of the present invention.
Figure 3:
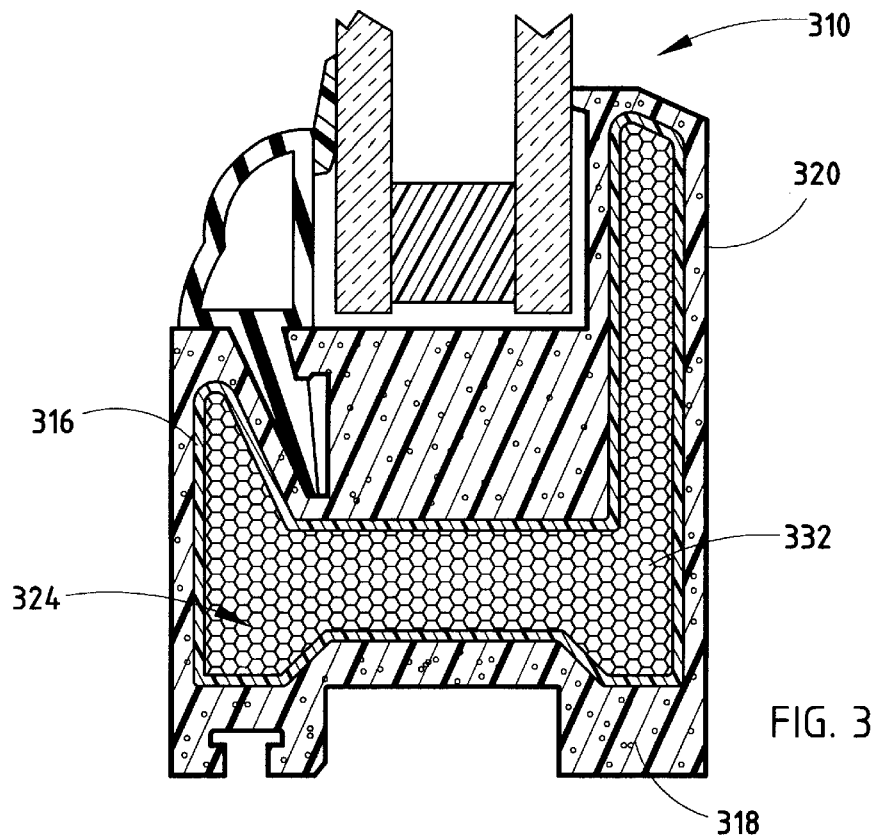
FIG. 3 is a cross-sectional end elevation illustrating a second embodiment of the present invention.
Figure 4:
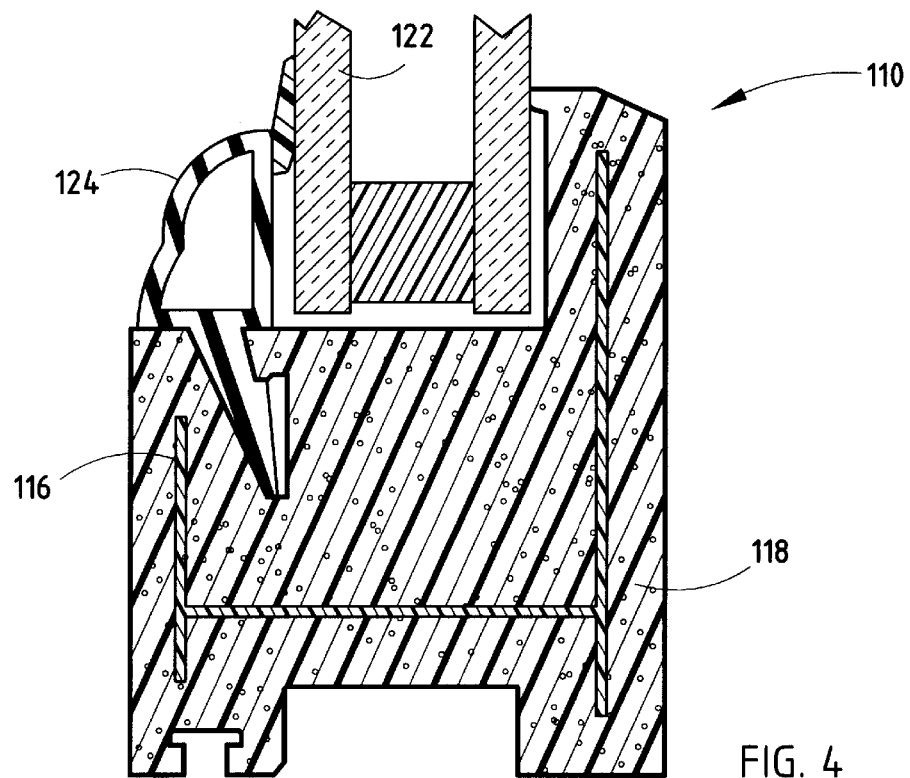
FIG. 4 is a yet another cross-sectional end elevation illustrating a third embodiment of the present invention.

As indicated above, FIGS. 2, 3, and 4 all depict different examples or embodiments of the underlying inventive concept, while FIG. 1 illustrates a relatively recent prior art structure, as referred to in the above "Background," based on a different concept but also utilizing a composite structure made by co-extrusion of both solid and foam PVC and the like. As will be clear upon inspection, the prior art structure 10 of FIG. 1 essentially comprises a continuous outer encasement or cladding 12 of solid PVC or the like whose interior is filled with foam or cellular PVC 14. Various versions of such "clad" structures have been proposed and/or used in the past in connection with door or window components, and have certain structural advantages over the all-foam type of structures referred to above, while at the same time having the corresponding disadvantages or unfavorable economic aspects noted.

As indicated above, FIGS. 2, 3, and 4 depict various examples or embodiments of the present invention, of which the structure 110 of FIG. 4 depicts the internal I-beam structure 116 having the simplest or least complex overall shape and nature. That is, as illustrated, this internal reinforcement element comprises a relatively large and wide-flanged "I" cross section which in essence spans essentially all of the interior cellular structure or foam portion 118 of the sash component involved, and which incorporates solid, single-layer, planar component sections (flanges and web). The rigid internal reinforcement 116 is shown embedded within the cellular structure 118 of the embodiment 110 through use of a cross-headed die arrangement. While the particular profile shape and type of component made in accordance with this procedure is subject to wide variance, where this comprises a sash as illustrated in FIG. 4, an I.G. unit or other such glazing member 122 is disposed in a corresponding recess, and sealed in place by a glazing bead 124 of a known nature which either incorporates an integral attachment flange that is received within a corresponding recess formed in the foam portion 118 or may be attached by a variety of standard applications commonly known to the art. The embodiment 110 is perhaps the prime example of the underlying concept, i.e., provides a maximum benefit obtained through the use of design characteristics as opposed to additional material, particularly when it incorporates relatively thin I-beam sections of reinforcement materials. Of course, these could be either thicker or thinner than illustrated in FIG. 4, and they need not be of the same thickness. One example of such thickness for a sash component would be in the range of 0.55 to 0.08 thousandths of an inch, with the density of the foam portion 118 being on the order of 0.55 grams per cubic centimeter.

A further example of the concept underlying the embodiment 110 of FIG. 4 is illustrated in FIG. 2, in which corresponding elements or structures generally carried the same numbering but use the prefix number "2" instead of "1" as in FIG. 4. This embodiment 210 employs a more complex rigid-walled internal member 216, which not only defines a large I-shaped structure but one which has an enclosed cavity 222. In this form, the rigid-walled support or reinforcement member 216 is also of a generally tubular overall shape, which further augments its structural strength and reduces the amount of rigid PVC material from that which would be required in having a solid I-type structure of corresponding dimensions, although of course this more complex hollow shape requires a greater amount of material than the simple, planar I-beam 116 of the previous embodiment. The generally tubular nature of cavity 222 not only provides increased structural strength in and of itself, but also allows the use of an additional strengthening member where that is desired, which may be inserted longitudinally inside cavity 222 (such additional reinforcement preferably but not necessarily having a shape complementary to the interior profile of cavity 222 so as to fit conformably inside and extend around or at least lie in contact with the inner periphery of cavity 222). Of course, this additional member may be of wood, metal (aluminum or steel), engineered polymeric or other such material, and may have essentially any desired cross-sectional configuration so as to meet practically any given set of requirements, on a selective basis, e.g., where additional resistance to deflection is most critical (primarily, the meeting rails and upper sash stiles). This embodiment offers much is, improved stiffness over a standard foam sash having little or no such internal reinforcement member, as well as the advantage of selective reinforcement to obtain the necessary degree of resistance to deflection in those particular sash members which experience the highest level of deflection stress. This allows a given window or other fabricator the option of producing very high-performance windows without maintaining a separate inventory of specialized sash profiles. As in the case of embodiment 110 of FIG. 4, embodiment 210 of FIG. 2 preferably includes an external skin or wall 220, which may comprise an essentially rigid self-skinned portion extruded with characteristics similar to those obtained using the "Celuka" process.

The further embodiment 310 of FIG. 3 offers an even more advanced approach than that of FIG. 2. Utilizing a tri-extrusion method, embodiment 310 incorporates an integral reinforcement 324 within the cavity 332 provided inside co-extruded rigid internal wall 316, which again embodies a generally I-shaped cross-sectional configuration. Many different materials and structural formations may be utilized for the integral reinforcement 324; however, a glass-filled polymer of fiber/polymer compound may offer the best stiffness characteristics and is presently considered to be preferred for this reason. In the form illustrated in FIG. 3, the integral reinforcement 324 is of a honeycomb or other such multi-walled matrix nature, which also is considered to be preferred or at least particularly advantageous. As will be understood, the primary concept presented in this embodiment is that of a tri-extrusion which provides an integral internal reinforcement member in a matrix consisting of hard-skinned Celuka-type self-skinning cellular foam, such integral reinforcement member comprising a co-extruded rigid-walled tubular member, preferably of I-shaped cross section, containing a high-preformance reinforcement such as an engineered fiber or polymer filler.

The several different structures illustrated and described above are in a broad sense merely considered examples and to some extent preferred embodiments of the underlying concept, and each is considered to possess novel and unobvious attributes while exemplifying the underlying concept in different forms. As will be appreciated, the underlying concept may be embodied in numerous different particular ways, and the particular examples set forth above are also subject to modifications and variations. In this regard, the internal reinforcement need not in a strict sense be of I-shaped cross section even though that is preferred and believed to provide the maximum benefit; further, the internal cavity need not be defined by a rigid PVC or other such co-extruded wall, as illustrated in these particular embodiments, and may for example simply be provided as a void in the extruded foam, preferably including a Celuka self-skinned surface. Where rigid PVC or other such walls are used they need not of necessity be of uniform thickness. While the principal purpose of such an internal void would be to optionally receive a reinforcing member of metal or the like, as noted above, there may be other uses of such a cavity as well, whether defined by rigid walls or simply by self-skinned extruded foam. As will be understood by those skilled in the relevant art, both the "Free Foam" and "Celuka" foam extrusions processes are now widely known and used, as a general matter, and date back many years. Many reference sources exist for this technology, and reference is made here to U.S. Pat. Nos. 3,764,642 and 4,383,812, the first of which was assigned to the French company Ugine Kuhlmann, predecessor of Elf Atochem, S. A., which is believed to be the developer of the "Celuka" process, and which initially used such term. In more recent years, this term has come into widespread use as the name of the inward-blown self-skinning foam extrusion technology involved.

The above description is considered that of preferred embodiments only. Modifications of these embodiments may well occur to those skilled in the art and to those who make or use the invention. Therefore, it is to be understood that the embodiments shown in the drawings and described above are merely for illustrative purposes and should not be used to limit the scope of the protected invention, which is defined by the following claims as interpreted according to the principles of patent law, including the doctrine of equivalents.

The invention claimed is:

1. An integrally reinforced lineal building component, comprising in combination:

an elongated member having a substantially constant cross-sectional shape extending along substantially the entire length of said building component and comprised of cellular material forming the body and major cross-sectional portion of said building component; and an elongated reinforcement element having a substantially constant cross-sectional shape extending along substantially the entire length of said building component and disposed inside said elongated member and bonded integrally thereto, said reinforcement element having at least two flange-like portions integrally attached and disposed at an angle with respect to one another extending lengthwise of and generally parallel to said elongated member.

2. A building component according to claim 1, wherein said elongated member and said reinforcement element comprise a co-extrusion.

3. A building component according to claim 2, wherein said reinforcement element comprises a generally rigid unitary structure.

4. A building component according to claim 3, wherein said elongated member comprises a foamed polymeric structure and said reinforcement element comprises a solid polymeric structure.

5. A building component according to claim 4, wherein said elongated member includes an outer skin covering such member.

6. A building component according to claim 5, wherein said outer skin is integral with said elongated member and said member comprises a self-skinned cellular polymeric structure.

7. A building component according to claim 1, wherein said reinforcement element is generally I-shaped in cross section.

8. A building component according to claim 7, wherein said I-shaped cross section includes at least one longitudinal portion which comprises a solid and generally planar wall section.

9. A building component according to claim 7, wherein said I-shaped cross section includes at least one longitudinal portion which comprises a pair of mutually spaced walls defining a cavity therebetween.

10. A building component according to claim 9, wherein said I-shaped cross section defines at least one generally tubular portion.

11. A building component according to claim 10, wherein said reinforcement element comprises a generally tubular structure.

12. A building component according to claim 11, wherein said I-shaped cross section is generally tubular over substantially all of its extremities.

13. A building component according to claim 10, further including a reinforcement structure disposed inside said cavity.

14. A building component according to claim 13, wherein said reinforcement structure comprises an extrusion.

15. A building component according to claim 14, wherein said elongated member, said reinforcement element and said reinforcement structure together comprise a tri-extrusion.

16. A building component according to claim 13, wherein said reinforcement structure comprises a multiple-walled structure.

17. A building component according to claim 16, wherein said multiple-walled structure defines a plurality of mutually adjacent cells.

18. A building component according to claim 7, wherein said elongated member and said reinforced element comprise a composite extrusion.

19. A building component according to claim 18, wherein said reinforcement element comprises a generally rigid unitary structure.

20. A building component according to claim 19, wherein said elongated member comprises a foamed polymeric structure and said reinforcement element comprises a solid polymeric structure.

21. A building component according to claim 20, wherein said elongated member includes an outer skin covering such member.

22. A building component according to claim 21, wherein said outer skin is integral with said elongated member and said member comprises a self-skinned cellular polymeric structure.

23. A building component according to claim 22, wherein said I-shaped cross section defines at least one generally tubular portion.

24. A building component according to claim 23, further including a reinforcement structure disposed inside said generally tubular portion.

25. A building component according to claim 24, wherein said reinforcement structure comprises a multiple-walled structure.

26. A building component according to claim 24, wherein said elongated member, said reinforcement element and said reinforcement structure together comprise a tri-extrusion.

27. A method for forming an integrally reinforced lineal building component, including the steps of:

forming an elongated member having a substantially constant cross-sectional area and comprised of cellular material forming the body and major cross-sectional portion of said building component;

forming an elongated reinforcement element disposed inside said elongated member and having a substantially constant cross-sectional area and at least two flange-like portions integrally attached and disposed at an angle with respect to one another extending lengthwise of and generally parallel to said elongated member; and bonding said elongated member and said elongated reinforcement element integrally together.

28. A method for forming a building component according to claim 27, wherein said steps of forming an elongated member, forming a reinforcement element, and bonding said elongated member to said elongated reinforcement member include a co-extrusion process.

29. A method for forming a building component according to claim 28, wherein said step of forming a reinforcement element includes providing said reinforcement element with a generally rigid unitary structure.

30. A method for forming a building component according to claim 29, wherein said step of forming an elongated member includes using a foamed polymer as the structure of said member, and wherein said step of forming a reinforcement element includes using a solid polymeric structure as said element.

31. A method for forming a building component according to claim 30, wherein said step of forming an elongated member includes providing said elongated member with an outer skin covering such member.

32. A method for forming a building component according to claim 31, wherein said step of forming an elongated member includes providing said outer skin integrally with said elongated member, and wherein said step of forming an elongated member includes providing said member a self-skinned cellular polymeric structure.

* * * * *

UNITED STATES PATENT AND TRADEMARK OFFICE
CERTIFICATE OF CORRECTION

PATENT NO. : 6,003,277
DATED : December 21, 1999
INVENTOR(S) : Graham et al.

It is certified that error appears in the above-identified patent and that said Letters Patent is hereby corrected as shown below:

Column 5, Claim 13, Line 42:

"claim 10" should be -- claim 9 --.

Signed and Sealed this

Twenty-third Day of January, 2001

Attest:

Q. TODD DICKINSON

*Attesting Officer*  *Commissioner of Patents and Trademarks*